Figure 1:
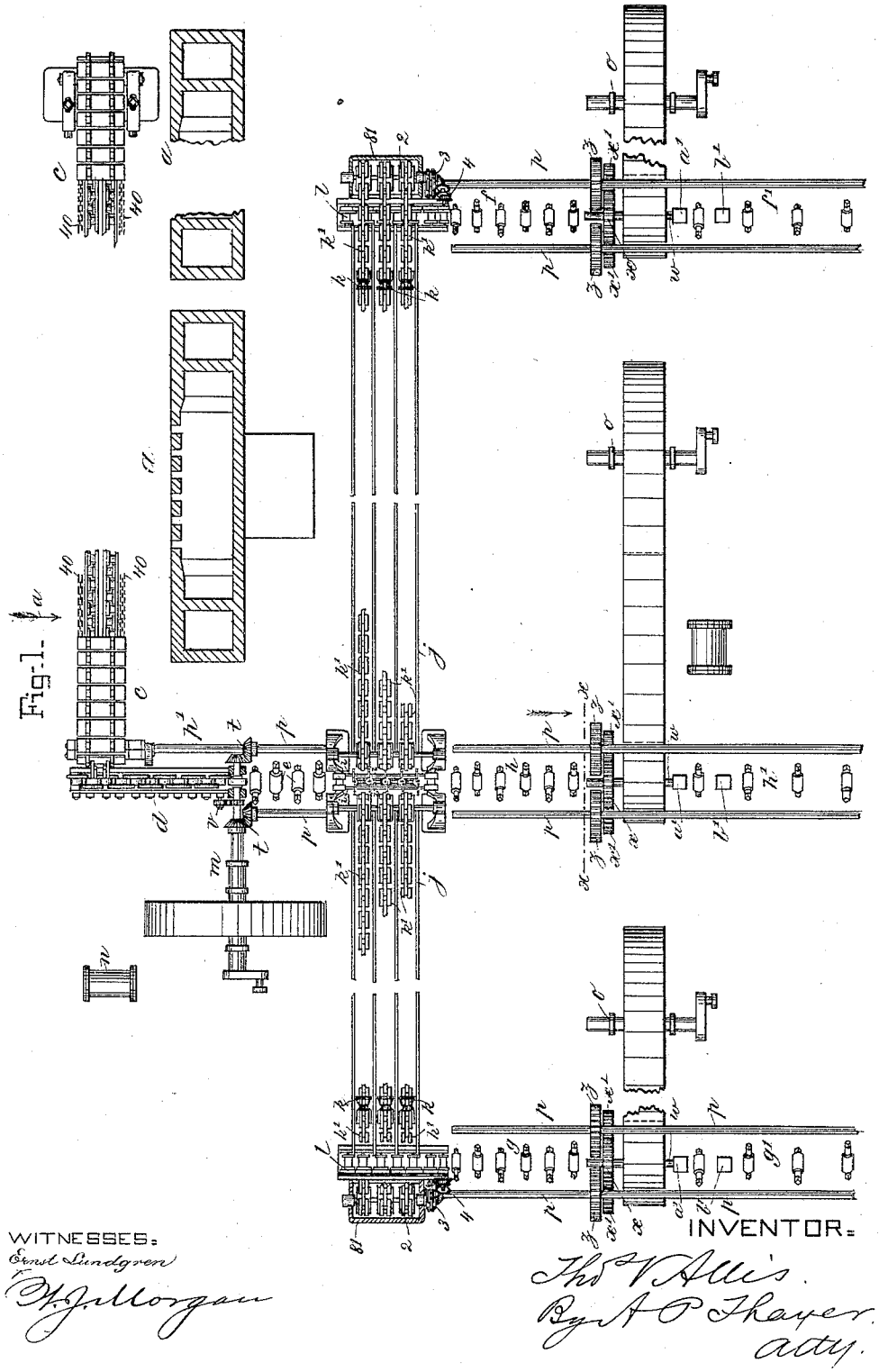

(No Model.) 12 Sheets—Sheet 1.

T. V. ALLIS.
ROLLING MILL PLANT.

No. 461,901. Patented Oct. 27, 1891.

WITNESSES:
Ernst Lundgren
T. J. Morgan

INVENTOR:
Thos V Allis
By A P Thayer
atty.

(No Model.) 12 Sheets—Sheet 4.

T. V. ALLIS.
ROLLING MILL PLANT.

No. 461,901. Patented Oct. 27, 1891.

WITNESSES:
Ernst Lundgren
W. J. Morgan

INVENTOR:
Tho. V. Allis
By H. P. Thayer.
atty.

(No Model.) 12 Sheets—Sheet 5.

T. V. ALLIS.
ROLLING MILL PLANT.

No. 461,901. Patented Oct. 27, 1891.

WITNESSES:
Ernst Lundgren
W. J. Morgan

INVENTOR:
Thos V Allis
By A P Thayer
atty.

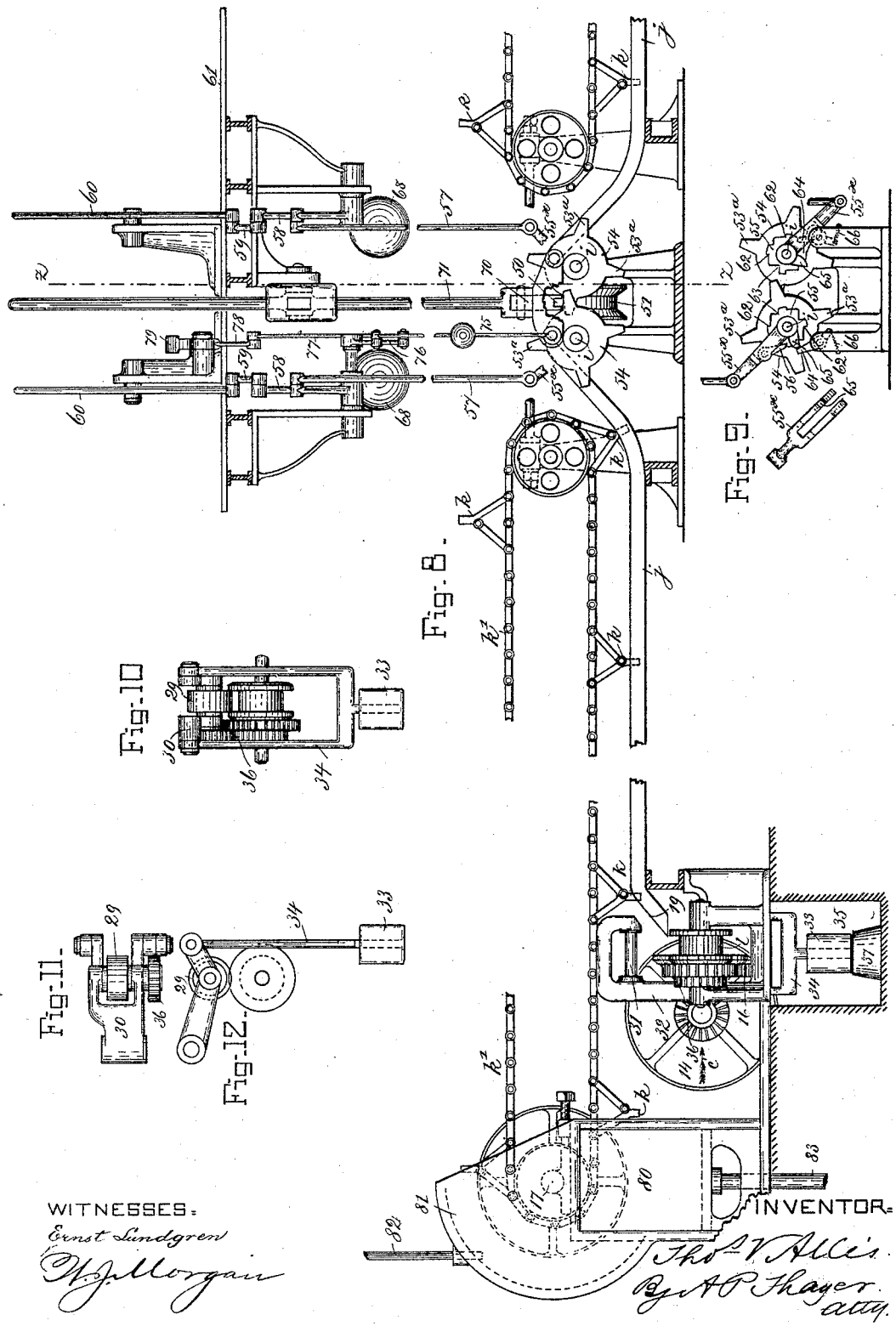

(No Model.)

T. V. ALLIS.
ROLLING MILL PLANT.

No. 461,901. Patented Oct. 27, 1891.

WITNESSES:
Ernst Lundgren
H. J. Morgan

INVENTOR:
Thos. V. Allis
By A. P. Thayer
atty.

(No Model.) 12 Sheets—Sheet 8.

T. V. ALLIS.
ROLLING MILL PLANT.

No. 461,901. Patented Oct. 27, 1891.

WITNESSES:
Ernst Lundgren
H. J. Morgan

INVENTOR:
Thos. V. Allis
By A. P. Thayer
atty

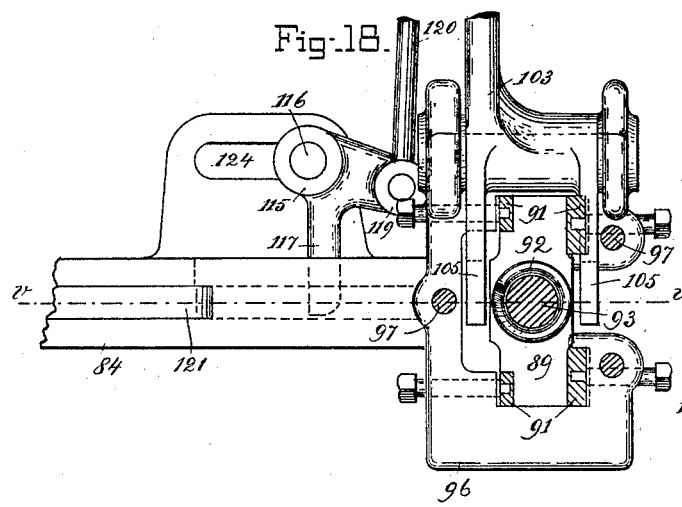

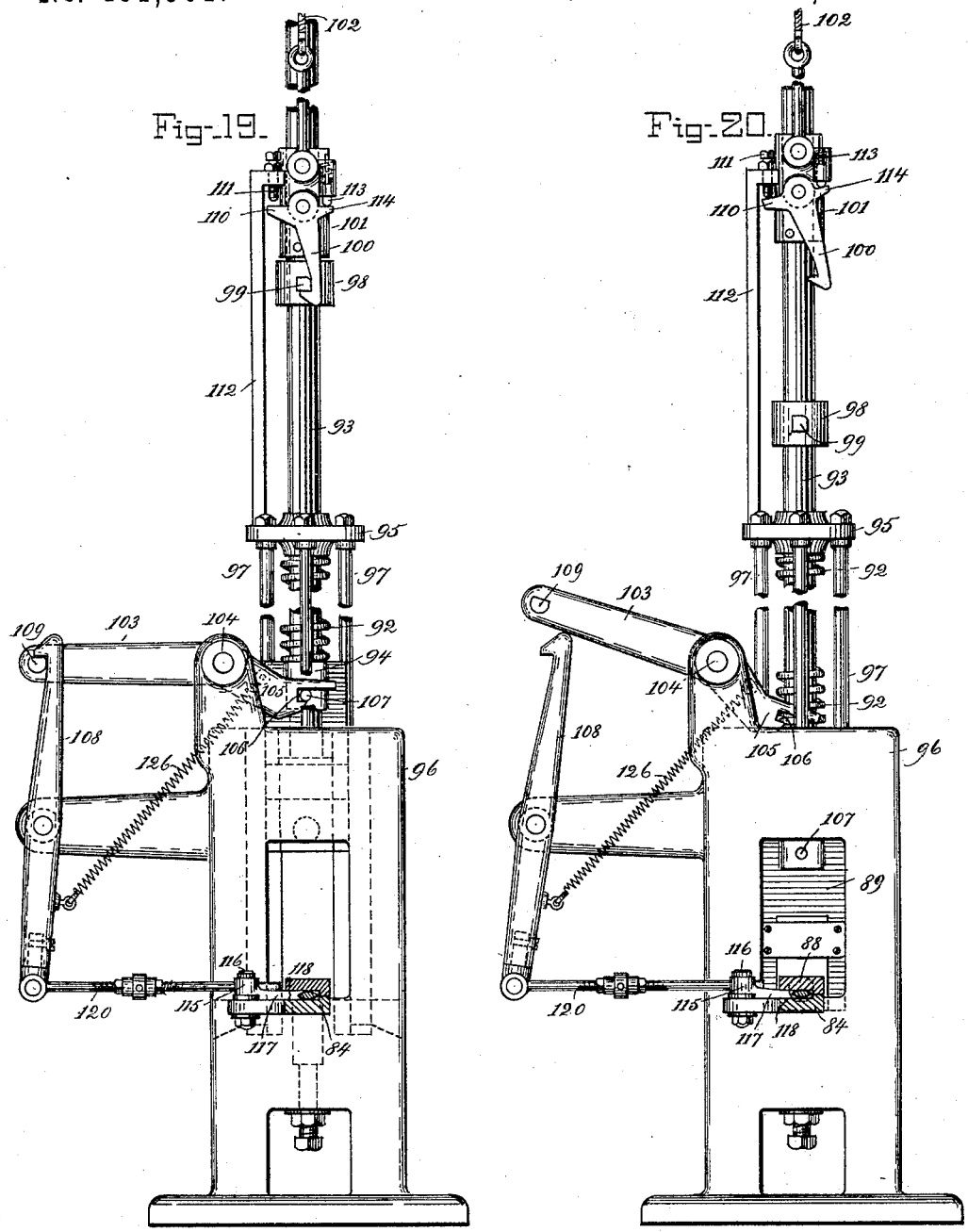

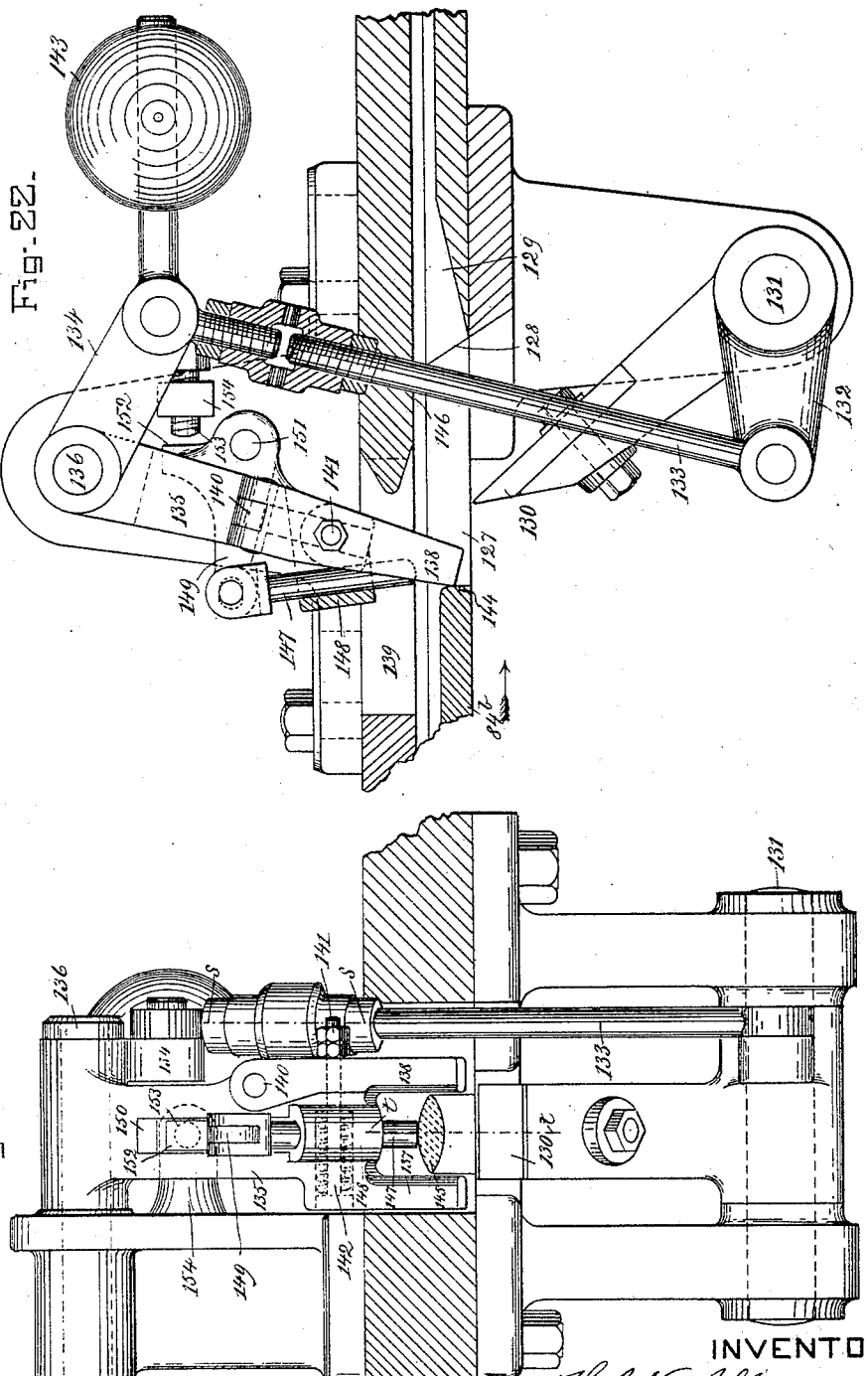

(No Model.) 12 Sheets—Sheet 12.
T. V. ALLIS.
ROLLING MILL PLANT.
No. 461,901. Patented Oct. 27, 1891.
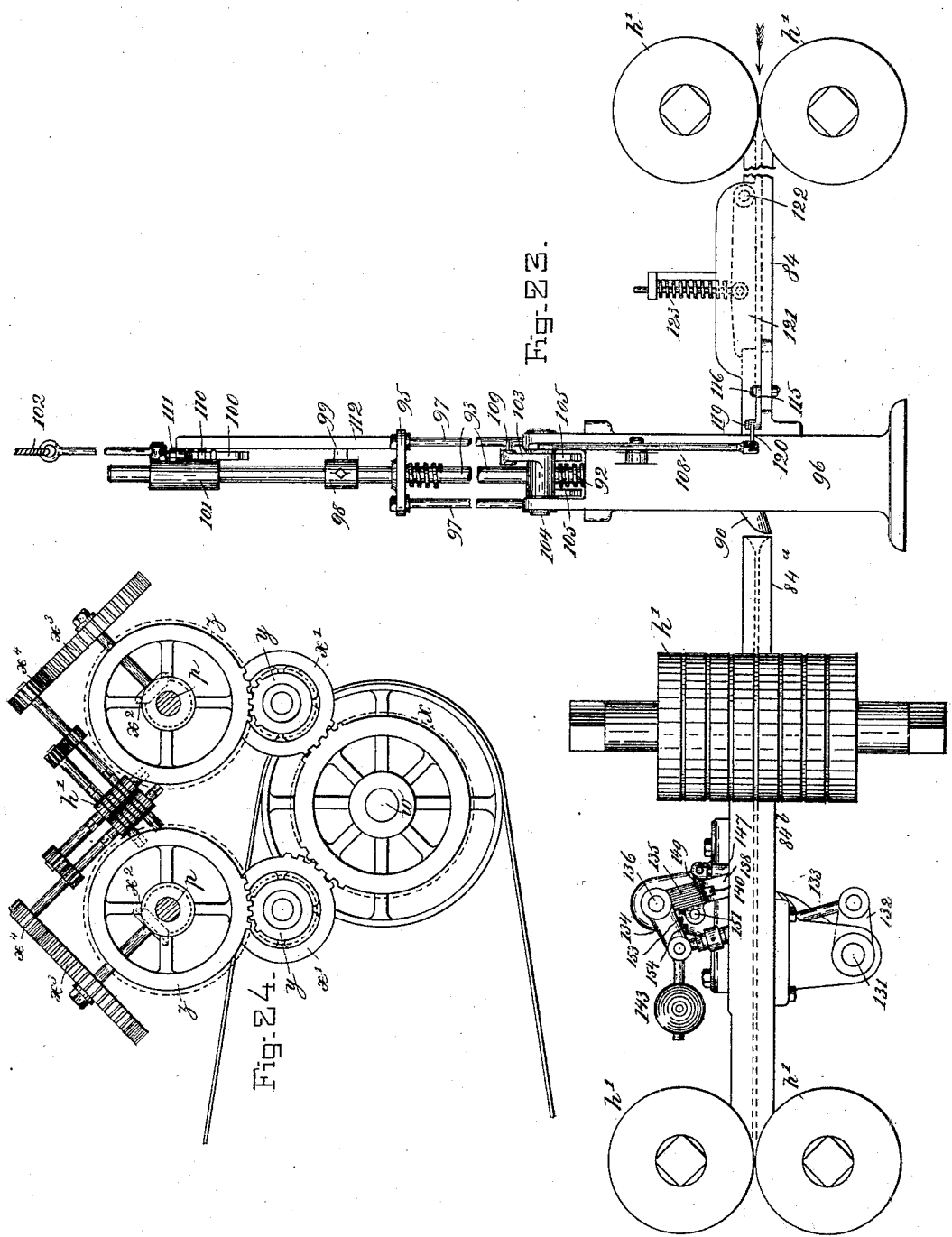
WITNESSES: INVENTOR.

UNITED STATES PATENT OFFICE.

THOMAS V. ALLIS, OF NEW YORK, N. Y.

ROLLING-MILL PLANT.

SPECIFICATION forming part of Letters Patent No. 461,901, dated October 27, 1891.

Application filed November 15, 1890. Serial No. 371,565. (No model.)

*To all whom it may concern:*

Be it known that I, THOMAS V. ALLIS, a citizen of the United States, and a resident of New York city, in the county and State of New York, have invented new and useful Improvements in Rolling-Mill Plants, of which the following is a specification.

My invention consists in an improved plant comprising a system of continuous trains of roughing or breaking-down rolls, several like trains of finishing-rolls, transfer mechanism for carrying the billets from the heating-furnaces to the roughing-rolls, and transfer mechanism for distributing the bars from the roughing-rolls laterally to the trains of finishing-rolls, whereby through first rapidly roughing billets down into short bars of considerably larger cross-section than wire rods and adapted to be readily transferred laterally from the place in which they are delivered from the roughing-train to finishing-trains in different lines laterally thereto, and by providing trains adapted for reducing such larger size down to wire rods and in sufficient number to work off such bars as fast as delivered from the roughing-rolls, I am enabled to provide a continuous-process mill having capacity for much greater output than as at present arranged, and adapted to produce rods of better quality because of reducing at higher heat in the earlier stages, as will be more fully explained further on.

My invention also comprises various details of construction and arrangements of apparatus pertaining to the system of rolls and transfer mechanism; also trimming apparatus for cropping the fore ends of the rods while in motion to facilitate the entering of the ends into the passes of the rolls; also trimming apparatus for similarly cutting the hind ends on which obstructive "fish-tail" shapes sometimes occur, all as hereinafter described, reference being made to the accompanying drawings, in which—

Figure 2:
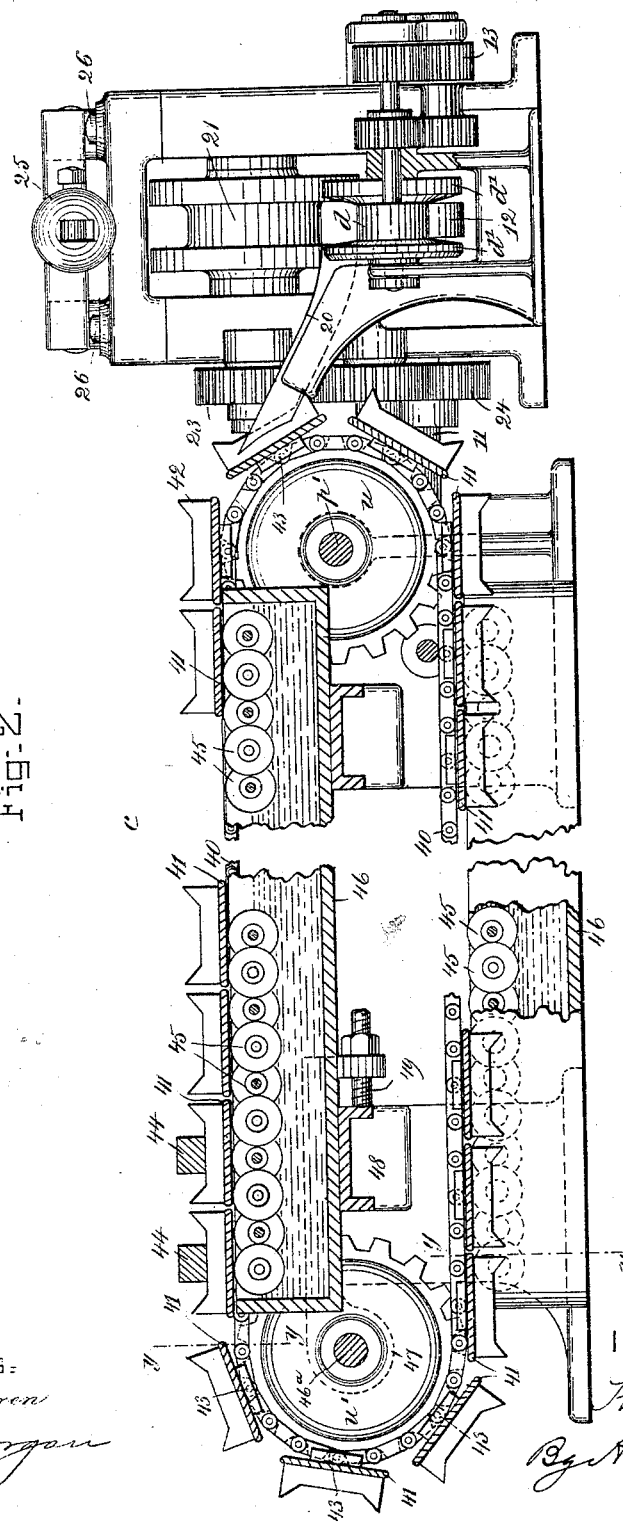
Figure 3:
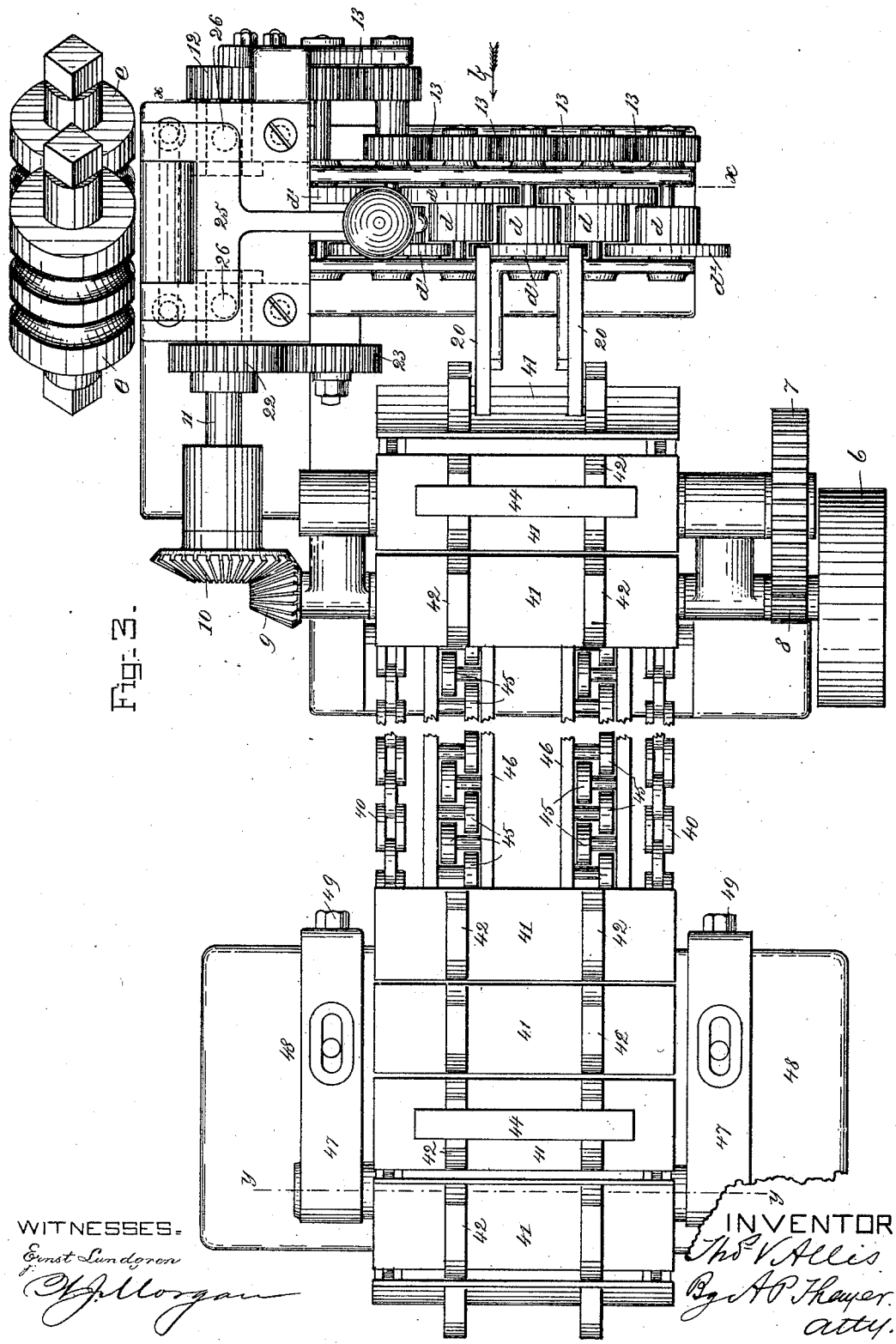
Figure 4:
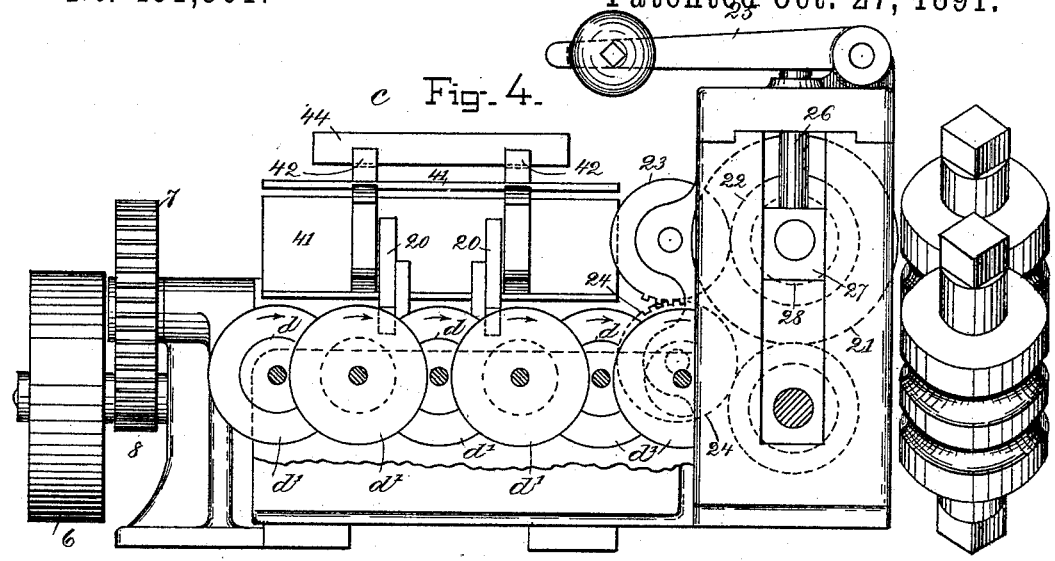
Figure 5:
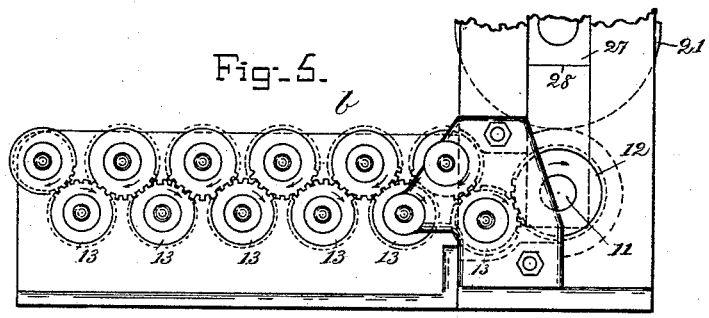
Figure 6:
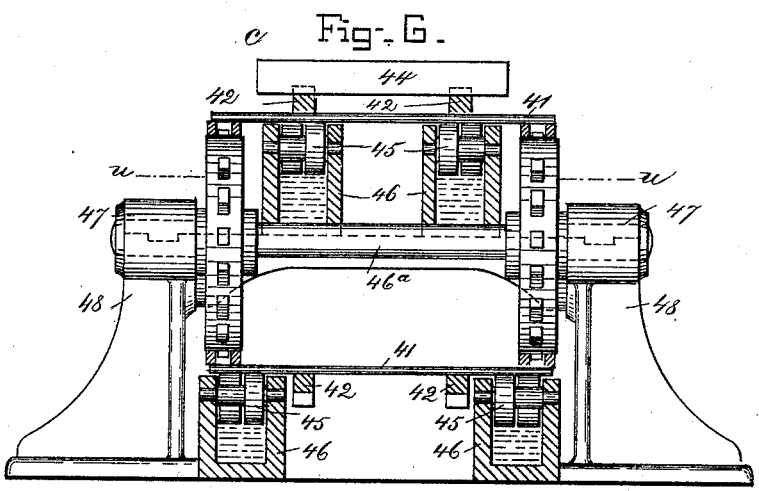
Figure 7:
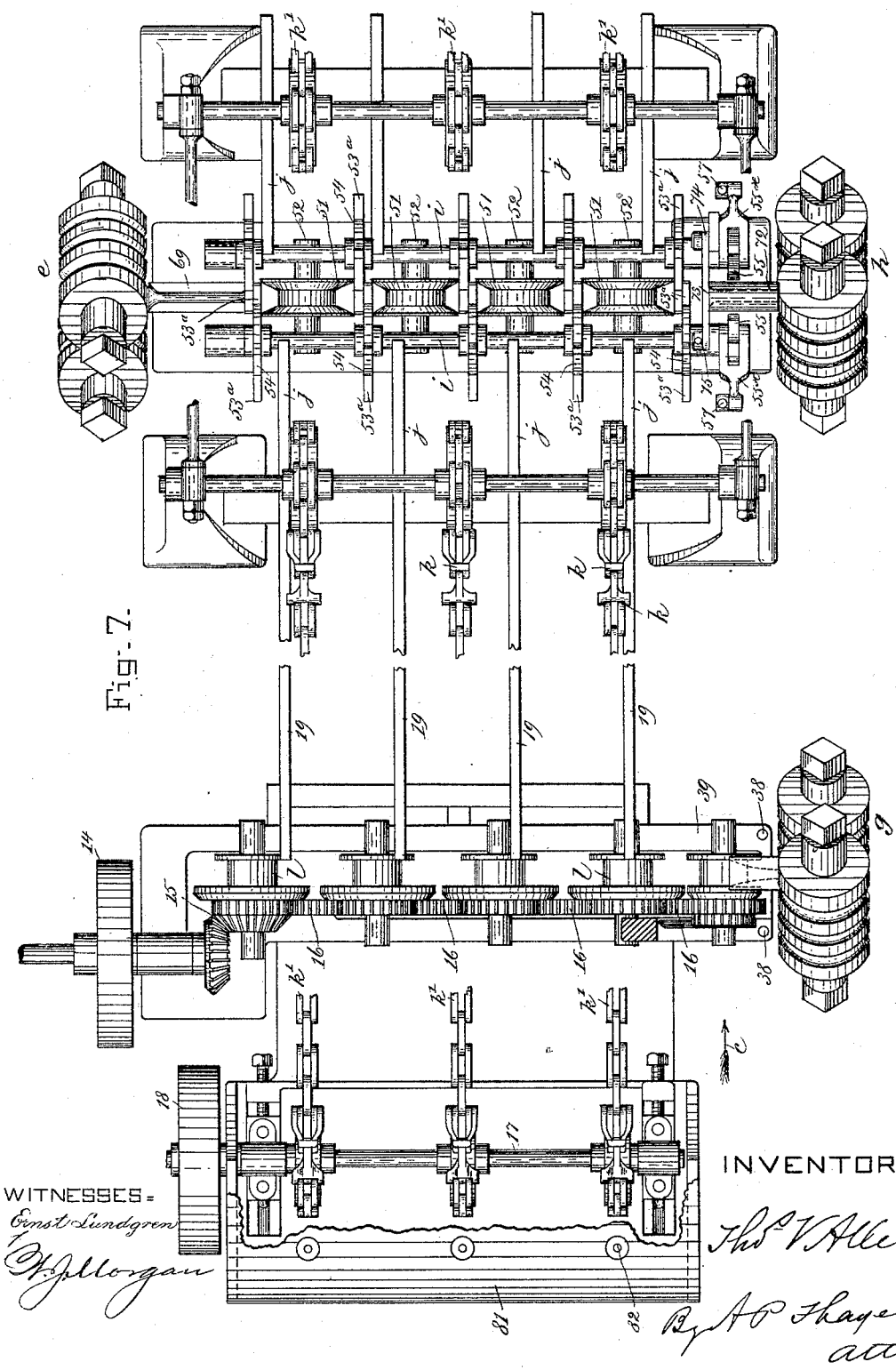
Figure 13:
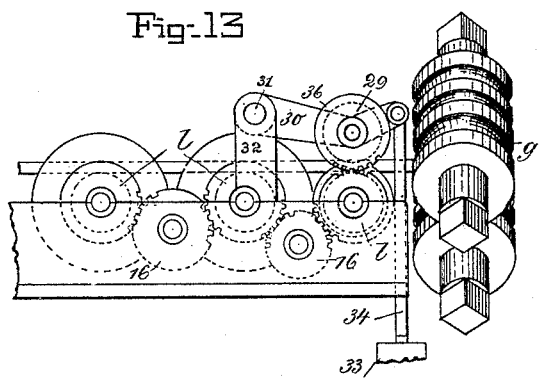
Figure 14:
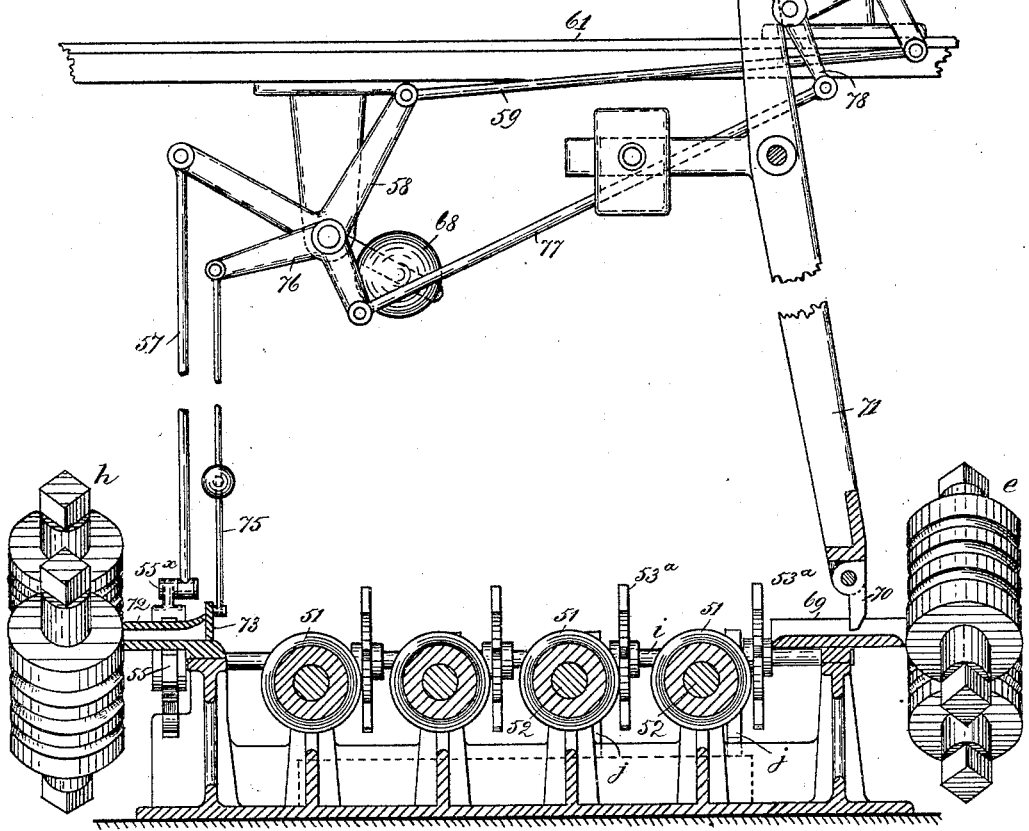
Figure 15:
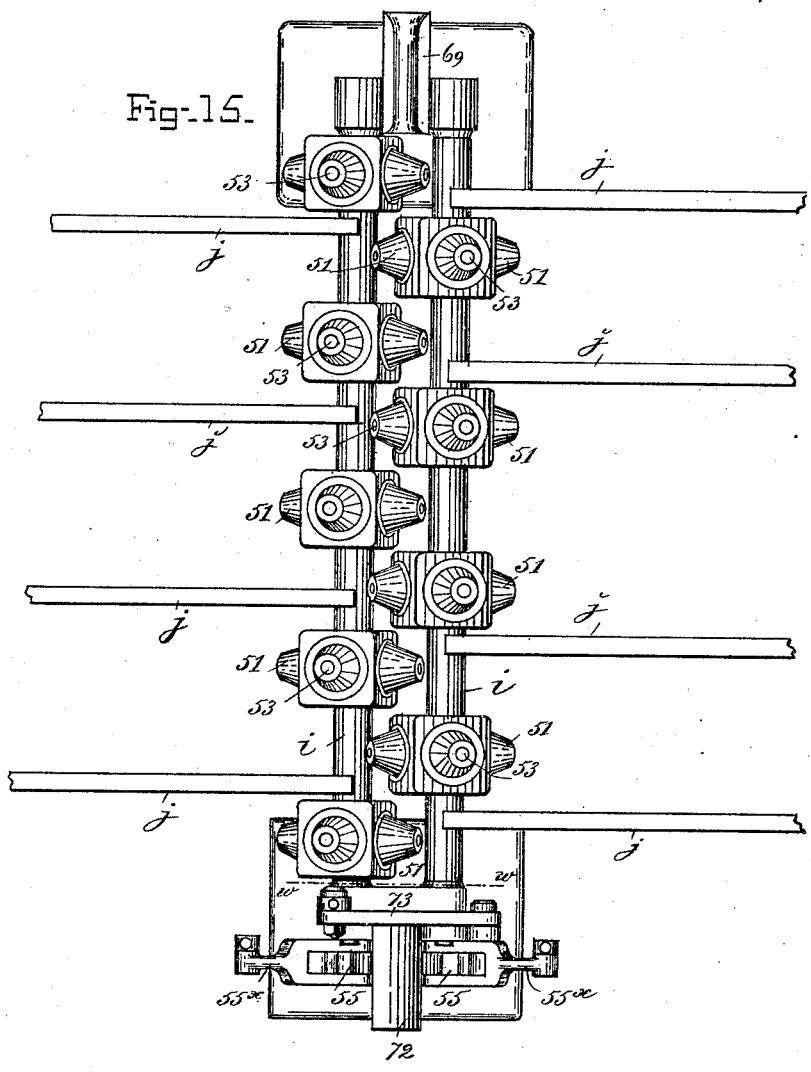
Figure 16:
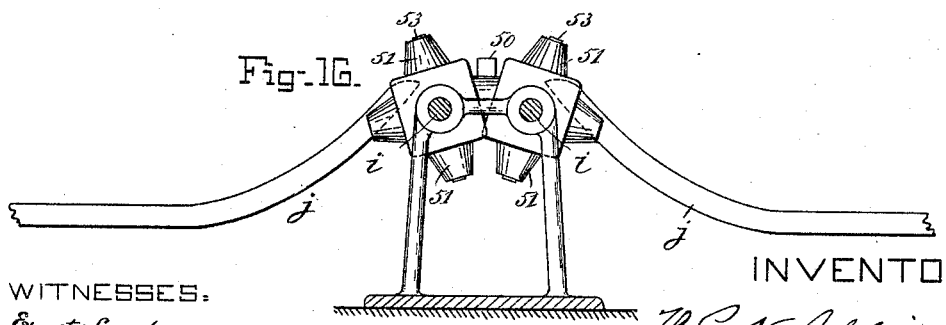

Figure 1 is a diagrammatic outline of the general plan of the mill intended to indicate in a simple way the general features. Fig. 2 is a side view, on a larger scale, of portions of transfer mechanism for carrying the billets to the roughing-train partly in sectional elevation and partly in side elevation, as seen in the direction of the arrow *a*, Fig. 1. Fig. 3 is a plan view of the apparatus of Fig. 2 with parts broken out. Fig. 4 is an elevation of the apparatus of Figs. 2 and 3, as seen in the direction indicated by the arrow *b*, Fig. 3, with a portion sectioned on line *x x* of said Fig. 3. Fig. 5 is an outside view of part of the apparatus of Fig. 3, as seen in the same direction. Fig. 6 is a transverse section of Figs. 2 and 3 on line *y y*. Fig. 7 is a plan view of transfer mechanism for distributing the bars from the roughing-rolls to the finishing-trains. Fig. 8 is a front elevation of said transfer mechanism of Fig. 7, with some parts included that are not shown in said figure, and with some parts in section and others detached for greater clearness. Fig. 9 is an elevation of a part detached from Fig. 8. Fig. 10 is a front elevation, Fig. 11 a top view, and Fig. 12 a side elevation, of parts of the apparatus of Figs. 7 and 8 detached. Fig. 13 is a side elevation of parts of Figs. 7 and 8 as seen looking in the direction of arrows *c*, and showing the devices of Figs. 10, 11, and 12 in position. Fig. 14 is a sectional elevation of Fig. 8 on line *z z*, with a pair of rolls at each end in addition. Fig. 15 is a plan view of a modified form of transfer apparatus that may be substituted for parts of said apparatus in Figs. 7 and 8. Fig. 16 is a sectional elevation of Fig. 15 on line *w w*. Fig. 17 is a sectional elevation of the trimming apparatus for trimming off the forward ends of the rods, and which I call the "cropper," the section being taken on line *v v*, Fig. 18. Fig. 18 is a horizontal section of Fig. 17 on line *u u*. Fig. 19 is an elevation of the cropper with the parts set ready for being automatically tripped by the end of the rod to be trimmed. Fig. 20 is an elevation of the same, showing the parts after the action of cropping the rod. Fig. 21 is an elevation of the fish-tail trimmer, as seen looking in the direction in which the rods run, and a cross-section of a rod and guideway. Fig. 22 is an end elevation of the fish-tail trimmer, with a part sectioned on line *t t*, Fig. 21, and a part on line *s s* of said figure. Fig. 23 is a side elevation of the cropper and fish-tail trimmer and three pairs of rolls, said cropper and trimmer being arranged in upright positions, and the rolls as alternately upright and horizontal to simplify the drawings. In this view the parts are adapted for the rods to run opposite to the direction indicated in Fig. 22, and the construction of the fish-tail trimmer is slightly modified. Fig. 24 is a detail in transverse section on line $x\ x$, Fig. 1, showing the arrangement of gearing connecting the driving-shafts of the roll-trains with the driving-engine.

Referring in the first place to Fig. 1 for a general outline of the mill, the devices represented at $a$ indicate a series of furnaces for heating the billets, of which furnaces there will be in practice a sufficient number to supply the billets as fast as they can be rolled by the mill.

$c$ represents an endless carrier, onto which the billets are to be delivered from the furnaces by tongs arranged to travel on overhead rails of any approved kind, said billets being placed crosswise of the carrier.

$d$ represents a series of carrying-rolls arranged at the delivery end of the carrier $c$ to receive the billets cast off from the end of said carrier and convey them forward lengthwise in a direction at right angles to the endless carrier $c$ and deliver them into the train of roughing-rolls indicated at $e$. This train will consist of a sufficient number of pairs of rolls to reduce the billets of the usual size—say four inches square—for making wire rods into short bars of practicable size and length to be shifted laterally after delivery from said train for transfer to the finishing-trains of rolls, as trains $f$ and $g$, at the right and left hand, respectively, and parallel to the line in which the bars are delivered from the roughing-rolls; but some bars are also shifted straight ahead to the intermediate finishing-train $h$, according as its turn comes, these three trains of finishing-rolls being calculated to receive and finish the bars from the roughing-rolls as fast as delivered therefrom. From the roughing-rolls the bars are delivered to and come to rest on a receiver over the arms of tumbling-shafts $i$, from which they are delivered either to the right or left or straight ahead, according to which of the trains of finishing-rolls they are destined. By the tumbling-shafts they are thrown down the inclines of one or the other of the slideway-bars $j$, along which slideways the bars are pushed sidewise by the pusher-arms $k$, carried by chains $k'$ onto carrying-rolls $l$, by which they are carried lengthwise into the finishing-trains $f$ or $g$, and by these continued into other following trains $f'$ or $g'$, which are calculated to complete the reduction of the bars to wire rods. The bars to be shifted straight ahead into the intermediate train $h$ of finishing-rolls are shoved along by a lever device, (see Figs. 8 and 14,) the tumbling-shafts then remaining inactive, these bars being in like manner reduced in the finishing-train $h$ and the following train $h'$. I have represented the roughing-train $e$ and its carrying-rolls and endless carrier as geared with the main shaft $m$ of the driving-engine $n$, and each of the finishing-trains as geared with a separate engine $o$, which will be the preferable arrangement in practice, but of course any other approved means for the application of the driving-power may be adopted.

In Fig. 24, which represents in end elevation the details of the roll-trains more fully, it will be seen that the reducing-rolls are arranged alternately in two longitudinal planes inclined to the base and relatively to each other, so that the alternate pairs of rolls are at right angles to each other. This is also indicated by the oblique arrangements of the rolls in Fig. 1, and for the rolls of each of the different planes there is provided a driving-shaft $p$, ranging along the train and in some way geared with the driving-engine, as by the bevel-wheels $t$ of the roughing-train, one of said shafts $p$ being extended, as at $p'$, Fig. 1, as one plan that may be adopted for the driving-wheels $u$ of the endless carrier $c$, while the carrying-rolls $d$ are geared by the spur-wheels $v$ with the engine-shaft $m$; but the drivers $p$ of the roll-trains may be geared with the driving-engine by the counter-shaft $w$, spur-wheel $x'$, and toothed wheels $y$ and $z$, as represented for the finishing-trains, (see Fig. 24,) said shafts $p$ being geared with the rolls by bevel-wheels $x^2$, spur-wheels $x^3$, and pinions $x^4$.

In Fig. 1, the conveyer-chain-driving wheels 2 are represented as geared at 3 with one of the roll-driving shafts $p$ suitably extended for that purpose beyond the length necessary for driving the rolls, and the carrying-rolls $l$ are likewise represented as geared with said shaft at 4, to indicate one way in which they may be geared; but it may be preferred to drive these chains and the carrying-rolls in connection therewith, also the chains of the endless carrier $c$ and the carrying-rolls therewith independently of the roll-driving shafts, for which purpose I have in the case of the carrier $c$ and rolls $d$ geared the chain-wheel shaft with the high-speed driving-pulley 6, Fig. 3, by the spur-wheel 7 and pinion 8, and to the shaft of pulley 6 have geared the carrying-rolls $d$ through the bevel-pinion 9, wheel 10, shaft 11, and spur-wheel 12, said wheel 12 gearing with an intermediate wheel 13, which gears with the last of the series of carrying-rolls $d$, from which the motion is transmitted to all the others of the series by similar intermediate wheels 13, as clearly shown in Figs. 3 and 5. In the case of carrying-rolls $l$ I have also provided for driving them separately from the roll-driving shafts and also separately from the pushing-chains $k'$ by a pulley 14, Fig. 7, geared to one of the rolls $l$ by the bevel-wheels 15, and the driving-shaft 17 of the pushing-chains has a pulley 18 to be driven independently, which will be the preferable arrangement.

The carrying-rolls $l$ are geared together in a train by intermediate wheels 16, substantially the same as carrier-rolls $d$ are. Said rolls $l$ and also carrying-rolls $d$ have wide guiding-flanges, between which the billets and bars are received from the chains down the inclines 19 and 20, respectively, and by which flanges the billets and bars are guided forward into the rolls. As the billets are comparatively short, it is important to have the rolls $d$ closer together than the flanges would permit if flanged on both sides, wherefore these rolls are made with only one flange $d'$, and they are placed with the flange of one roll overlapping the unflanged side of the next roll alternately, thus enabling the rolls to be placed close together, and also providing guide-flanges for both sides.

As the billets or bars merely resting on the carrier-rolls $d$ or $l$ will not have such positive thrust as will always insure the entry of the ends between the first pair of rolls, to which they deliver said billets or bars, I provide a gripping-roll, as 21 or 29, over the terminal roll of the series of carriers to work together with said terminal roll for gripping the billet or bar more effectually, said gripping-roll 21 being positively geared, as by its toothed wheel 22 and the intermediate wheels 23 and 24, with the shaft of the lower carrying-roll, which gears with the rest of the carrying-train, said gripping-roll being thus so geared as to permit it to rise and fall according as the billets or bars may vary in thickness and to grip them alike for the requisite power to thrust them into the reducing-rolls, the power to so grip the bars or billets being governed by weighted levers, as 25 or 30, suitably arranged for thrusting the gripping-roll downward, as through the fulcrum-posts 26, resting on the journal-boxes 27, arranged to rise and fall in the housings and limited as to the fall by the seats 28, which are gaged to prevent the gripping-roll from falling below the level, permitting the billets or bars to enter and be properly gripped, below which level such entry of the bars or billets would be obstructed. This gripping-roll may of course be geared in any other approved way, and it may be located back of the terminal feed-roll, if desired. Gripping-roll 21 is grooved and the roll below is plain to work between the flanges, and these rolls are somewhat larger in diameter than the rest of the carrying-rolls $d$ for greater strength and to provide more space for the flanges of roll 21 to clear the flange of the next carrying-roll; but in the case of the carrier-rolls $l$, where, owing to the greater length of the bars to be carried, it is not necessary to have the rolls placed so close together, the gripping-roll 29 has a plain face and works between the flanges of the terminal carrier-roll $l$. Said roll 29 is pivoted in the forks of the lever 30, which is supported at one end on the pivot 31, mounted in the standard 32, and from the free end of the fork has the weight 33, suspended by the yoke 34, reaching into a pit 35, where the weight is out of the way and more protected from disturbance. In this case the gripping-roll is geared directly with the lower terminal roll by the spur-wheels 36, which may be used here because the bars have greater uniformity of size than the billets have and the range of rise and fall of the gripping-roll is so slight that the proper mesh of the wheels 36 is not affected. In this case the fall of the gripping-roll when there is no bar under it may be limited by a seat 37, on which the weight 33 may come to rest in the pit, or any other stop may be provided. The members of the weight-suspending yoke may be guided in holes 38 in the bed-frame 39, supporting the journals of the carrying-rolls $l$.

The endless billet-carrier $c$ consists of the chains 40, running over the driving chain-wheels $u$, before referred to, and the corresponding carrying-wheels $u$, on which chains the plates 41, supporting the billet-carrying saddles 42, are placed transversely and pivoted, as at 43, suitably to receive the hot billets 44 from the furnaces, as shown in Figs. 2, 3, 4, and 6, and deliver them to the slideways 20, down which they pass to the carrying-rolls $d$. Between the chain-wheels $u$ $u'$ carrying-rolls 45 are placed under said plates in both the upper and lower ranges of the carrier for preventing the carrier from sagging, and these rolls are mounted in troughs 46, which are to be kept filled with circulating water to prevent the carrier from being overheated by the billets. Any suitable arrangement of supply and discharge pipe connections may be provided to maintain the circulation of the water. The shaft $46^a$ of the chain-wheels $u'$ is mounted in the journal-boxes 47, which are adjustable on the bench 48 for taking up the slack of the chains by the adjusting-screws 49.

The bars 50, Fig. 8, are delivered from the roughing-rolls on the receiver between the tumbling-shafts $i$, and consist of rolls 51, employed to facilitate the lengthwise movements of the bars both when issuing from the rolls and when said bars are to be delivered in the same lengthwise direction to the intermediate finishing-train $h$, said receiving-rolls being in this example either mounted on the fixed pivots 52 or on the pivot-arms 53 of the tumbling-shafts $i$, according as it is preferred to use such arms, Figs. 15 and 16, or the corresponding arms $53^a$ of disks 54, Figs. 7, 8, 9, and 14, which latter may be preferred for being cheaper to make and to repair in case of breaking. However the receiving-rolls and the arms may be constructed or arranged, the arms of the respective shafts overlap each other under the bars resting on the receiving-rolls, so that the bars may be tumbled to either side, according as they are delivered to either of the trains $f$ or $g$ of the finishing-rolls by turning the corresponding tumbling-shaft a quarter of a revolution. For so turning these shafts each one is provided at one end with a ratchet-wheel 55, pawl-lever $55^\times$, and pawl 56, which pawl-levers are connected by the rods 57, bell-cranks 58, and rods 59 with the hand-levers 60, mounted on the overhead platform 61, where an attendant will stand to work said lever, as required. These ratchets have the requisite notches 62 for engaging the pawls 56 to shift the tumbling-shafts, and they have other reversely-arranged notches 63 with which stop-pawls 64 are provided to limit the turning of the tumbling-shafts for stopping the arms in the positions for taking the bars properly. To disengage these stop-pawls 64 when the shafts are to be turned, the pawl-levers 55$^\times$ have a tappet-arm 65 projecting from the hub in such relation to said pawls that they come in contact with them and force them out of the notches, when said pawl-levers are raised to the extent that their pawls drop into notches 62 preparatory to turning the shafts, as will be seen in the left-hand side of Fig. 14, where the pawl-lever 55$^\times$ is represented as raised preparatory to shifting the shaft of that side of the bar which will be effected by thrusting lever 60 in the direction indicated by the arrow in Fig. 14. The pawls 64 are forced into the notches 63 by springs 66. The pawl-lever 55$^\times$ at the right hand of Fig. 9 shows the position after shifting the tumbling-shaft, and in which it rests till the next operation, its lever 60 being in the reverse of the one shown in Fig. 14; and, connected with the other pawl-lever, the bell-cranks 58 have a counterpoise 68 to balance the rods 57 and pawl-levers 55$^\times$. The bars issuing from rolls $e$ onto the receiving-rolls 51 are shot along the open guide 69 beyond the pivoted finger 70 of the lever 71, which drops behind the ends to engage them, so that the attendant on the platform above may push the bars forward into the guide 72 and the intermediate train of rolls $h$. To stop the bars short of this guide, in case they may shoot out too far from rolls $e$, when they are to be transferred to either of the other finishing-trains, a gate 73 is placed in front of said guide, said gate being pivoted at 74, so as to rise and fall for opening and closing, and the other end is connected to the rod 75, suspended from the bell-crank 76, connected by rod 77 with the arm 78 of the foot-lever 79 on the platform, so that the attendant may raise the gate when the bars are to go straight ahead. The rod 75 is weighted to keep the gate normally closed.

To cool the pushers $k$ and chains $k'$, by which the bars are pushed along the ways $j$ to the laterally-placed finishing-trains, I have provided the water-tanks 80 under the driving-shafts 17 of these chains with the hoods 81 over the fields in which the pushers rise in their return course, and the water-pipes 82 entering said hoods, so as to discharge onto the hot ends of the pushers, and with waste-pipes 83 for conducting the water away from the tanks.

Owing to the successive reductions of the rods in different planes alternately through the successive pass-grooves of the rolls, the ends are apt to split and otherwise become imperfect and obstructive, so that it is necessary to trim off a few inches of each end while in progress through the rolls, for which I provide in each finishing-train, and preferably between the first and second parts thereof, a trimmer, as indicated at $a'$, Fig. 1, for cutting the forward ends, which I call a "cropper," and, as at $b'$, another trimmer for the hind ends, which I call a "fish-tail" trimmer. The cropper is separately illustrated in the enlarged Figs. 17 to 20, inclusive, and the fish tail trimmer in Figs. 21 and 22, and both are shown together and in relation to the rolls in Fig. 23. As indicated in Fig. 1, the said cropper is located between the first and second sections of the finishing-trains of rolls and a rod-guide 84 is provided for conducting said rods from the last pair of rolls in advance of the cropper to it, and another guide 84$^\mathrm{a}$ is provided on the other side to conduct said rods into the next pair of rolls. This guideway conducts the rods between the stationary bed-cutter 86 and the movable drop-cutter 87, which are made to trim off the forward ends of the rods by the fall of said drop-cutter, which acts very quick and instantly passes below the trimmed end, and the opening 88, through the plate of the drop-cutter and the cutter-stock, comes into the line of the feedway, so that the trimmed rods continue their course unobstructedly through said openings and into the guideway beyond and onward into the next pair of rolls. At the back of the cutter-stock 89 there is a downwardly-inclined guard 90, under which the ends trimmed off are thrust downward, so as to be prevented from entering guide 84$^\mathrm{a}$ and to be discharged. The cutter-stock slides up and down in the ways 91, and has a strong spring 92 for accelerating the fall of the cutter. The spring is coiled around the stem 93 of the cutter-stock between its shoulder 94 and the guide-plate 95 for said stem, supported a suitable distance for such a guide above the top of the housing-stand 96 of the cutter-stock by the stanchions 97. The stem extends farther up and has a fixed collar 98 next above guide-plate 95, said fixed collar having a stud 99, projecting from one side for being caught by the lifting-hook 100 for raising the cutter to set it ready for dropping at the proper time. The hook 100 is carried on the sleeve 101, which slides up and down the stem 93 freely, said stem being extended a considerable distance above collar 98. The stem is suspended from a rope 102, which is to be understood as being extended over a guide-pulley above and down to within convenient reach of the attendant on the platform 61 for use by him to let sleeve 101 drop and catch on the stem of the cutter-stock by hook 100 and stud 98 and then raise and set the cutter ready for its fall. The cutter is thus set and held up for dropping by the forked lever 103, pivoted at 104, and having its fork-arms 105 embracing the upper end of the cutter-stock and notched in the ends 106 to engage the stud-pins 107, projecting from the sides of the cutter-stock, which, being raised against the upper long prongs of the notches 106, when the lever 103 is in the inclined position of Fig. 20, which is the position it assumes when the cutter has fallen, raises said lever and causes it to be hooked by the catch-lever 108 engaging its stud 109, said stud-pins at the same time being so engaged by the notches 106 as that the cutter-stock will be held up while lever 103 is held by the catch 108. After the cutter-stock is thus engaged by lever 103 a slight further upward movement of it detaches it from hook 101 by arm 110 being brought in contact with screw-stud 111, supported in the upright bar 112, extending up from guide-plate 95, and thus leaves the cutter-stock suspended by lever 103 and catch 108 ready to drop at the proper time for trimming off the advancing end of the rod. The spring-buffer 113, bearing against the arm 114 of catch-hook 100, insures the engagement of said hook with the stud 99, when the hook is let fall by the attendant for hooking on and raising up the cutter-stock. The cutter-stock thus suspended is to be tripped automatically by the advancing end of the rod that is to be trimmed off, which is provided for by the arrangement of the elbow-lever 115, fixed on the pivot 116 with its arm 117 extended into the guideway 84 through the slot 118, in one side of the guideway a little in advance of the cropper-stand, so as to be struck by the rod and pushed out of the way of the rod, which then passes said end, and with the other arm 119 of said lever, connected to the lower end of the catch-lever 108 by the rod 120, so that such movement of the elbow-lever 115 detaches the catch-lever from the cutter-stock-holding lever, and thus permits the cutter to fall. The movement of the rod is so rapid that it enters between the cutters the proper length to be cut off before the fall of the cutter, although tripped before the cutters are reached by said rods. The shocks of the rods on the arm 117 are so great, owing to the rapid movements of the rods, that they are apt to buckle against the sides of the guide, so that if confined positively they may be upset injuriously. Consequently I have provided the yielding upper side piece 121 in the guideway and pivoted at 122, so that it may rise and afford relief in such cases, and I provide a spring-presser 123, or it may be a weight, to force the said yielding piece back again directly after the shock, to straighten the rods and restore the guideway to the normal condition. The pivot 116 of the elbow-lever is adjustable along the slot 124 of the supporting-plate, and the slot 118 in the side of the guideway 84, for the arm of said lever, is similarly extended to enable the lever to be adjusted toward or from the cutters, according as will be found necessary in practice to determine the lengths of the portions of the rods to be cut off. When the trimmed rod has passed through the rolls, the spring 126 restores the catch-lever 108 and the tripping-lever 115 to the normal positions ready for the next rod to come forward. The trimmed rods continue running through the passage 88 in the plate of the cutter and the cutter-stock, which remain down till the rods run out. Then the attendant raises and sets the cutter-stock ready for the next rod.

The cropper will probably work best in practice when set at right angles to the axial planes of the rolls, from which the rods run to it, as is represented in Fig. 23, because then the cutters will close on the rods flatwise, or, in other words, in the plane of the greatest diameter of the rod, and will thereby cut better than if oblique to such plane and without twisting the rods; but this will depend in some measure upon what extent the rods are flattened, and may not be very essential, for it is evident the cropper may stand upright, the rolls being in the same oblique arrangement shown. For likewise automatically trimming the hind ends of the rods, which sometimes flatten out like a fish-tail, I have provided the fish-tail cutter to be located next beyond the rolls, which the rods enter from the cropper or in any other position along the train, as may be found best. In this device there is a slot 127 in the under side piece of the guideway 84$^b$, the width of which is greater than said guideway. The forward end of said slot is terminated by the bevel end wall 128, whereat the guideway is cut deeper than the rest and slopes upward at 129 to the level of the rest of the guideway to prevent the forward ends of the rods from catching on said end wall of the slot. Under this slot is the cutter 130, which swings on the pivot 131 and has an arm 132 for swinging it, which extends in the direction for swinging the cutter upward when said arm is pulled upward. This arm is connected by the rod 133 with the arm 134 of a fork 135, pivoted at 136, the jaws of which 137 and 138 project through the slot 139 in the upper side piece of the guideway and into the slot 127 of the lower guide-piece, so as to normally straddle the rods, which thus run between the jaws. One of said jaws is jointed to the shank of the fork at 140 and is coupled to the fork by the rod 141 and spring 142, allowing it to open, to some extent, by force overcoming the power of the spring. The arm 134 has a weight 143 at its outer extremity which maintains the fork and cutter in the normal position represented in Figs. 21, 22, and 23, with the ends of the jaws of the fork bearing against the end wall 144 of the slot 127 in the lower side piece of the guideway. The space between the jaws of the fork is the width of the rod 145, so that while the rod continues in the normal width the device remains inactive, but when a fish-tail end of greater width comes along and wedges in the fork it swings the fork in the direction in which the rod runs, (indicated by the arrow,) which raises arm 134, and said arm swings the cutter up against the rod just ahead of the fork, embedding the cutter in the hot metal, which causes it to travel with the rod and swings up in an arc and severs the rod, the power actuating said cutter being the pull of the rod as it is drawn along between the rolls, and thus cuts off the fish-tail against the under side of the upper guide-piece at 146, and the fish-tail thus cut off is thrust downward and ejected from between the jaws of the fork and through slot 127 by the discharger 147 sliding in the guideway 148 on the fork and pivoted at its upper end to the arm 149 extending backward through the slot 150 of the shank of the fork and pivoted at 151 to the ear-lugs projecting from the back of said shank, said arm 149 having the toe 152, which strikes against the stop-screw stud 153, supported in the fixed stud 154, when the fork swings forward and thus thrusts the discharger down to eject the fish-tails from the fork. The purpose of arranging the jaws to open is to prevent the severed end from binding so tightly in the fork that the ejector cannot discharge it.

In wire-rod making as conducted at present the rolling-mill is constructed and adapted for reducing billets to rods of about one-fourth of an inch in diameter or less to finish by the drawing process, and they are mostly finished by drawing, although of late some progress has been made in rolling them down to small sizes, and continuous finishing-trains have been proposed in connection with such rod-rolling mills for continuing the reduction down to small wire at the same time; but a short roughing-train for rapidly producing partly-reduced wire-rods and a system of numerous finishing-trains of like character for receiving and finishing such partly-reduced bars into wire-rods as fast as delivered from the roughing train is, as I believe, new in the art at the present time.

By my improvements in and construction of the roughing-train for producing shorter and larger bars from the billets in the first place, also through the advantages of my improved system of transfer mechanism and reducing-trains for rolling rods, I am enabled to lower the cost of rolled wire rods below that of the common way, as the following statement will show.

When billets are reduced in a single continuous train to the small size and great length of wire rods or thereabout they can only be turned out at a comparatively slow rate, because in a continuous train for reducing billets to wire rods of, say, No. 5 gage, so many pairs of rolls are required, about eighteen being the usual number, of which the last or delivery pair can only run up to a certain limit of speed, while all the rest must run proportionately slower as the rod elongates in each pair. Therefore the average speed is quite slow and only one rod will be turned out of such a train, while at least three bars can issue from my shorter train in the same time, and these will be further reduced to No. 5 size in the plurality of finishing-trains in a similar period of time, while three other bars are being produced in the roughing-train, and so on. Again, such long rods can only be transferred lengthwise to the finishing-trains in long guides, the finishing-trains being necessarily placed far away and requiring much greater space for the plant. To distribute the rods between two or more finishing-trains said trains have to be placed at the extremities of long-curved diverging guideways, demanding much greater space than is required for my system, in which the transfer to the middle train of finishing-rolls is almost instantaneous, while only a little more time is required for transferring to the laterally-placed finishing-trains, and all are grouped within much less space than if the transfer were made through curved guides.

I claim—

1. In a wire-rod-rolling plant, a primary roughing-train of rolls adapted for rapidly reducing the billets to short bars, substantially as herein described, in combination with a receiver whereon said bars are delivered from said train and come to rest, two or more trains of finishing-rolls adapted for reducing said bars to rods of small sizes, as No. 5 gage or thereabout, and hand-controlled transfer mechanism adapted for shifting said bars from said receiver to said finishing-trains, respectively, substantially as herein specified.

2. In a wire-rod-rolling plant, a primary roughing-train of rolls adapted for rapidly reducing the billets to short bars, substantially as described, in combination with a receiver, whereon said bars are delivered automatically from said train, a finishing-train in line with the roughing-train and at the extremity of said receiver, and a feeder adapted for advancing the bars from said receiver into the finishing-train, substantially as herein specified.

3. In a wire-rod-rolling plant, a primary roughing-train of rolls adapted for rapidly reducing the billets to short bars, substantially as herein described, in combination with a receiver whereon said bars are delivered automatically from said train, a finishing-train in line with the roughing-train and at the extremity of said receiver, a feeder to said train, one or more finishing-trains placed laterally to said roughing and finishing train, and transfer mechanism whereby said bars may be distributed to the finishing-trains at the will of the attendant, substantially as herein specified.

4. In a wire-rod-rolling plant, the combination of a roughing-train of rolls, a billet-feeder for said rolls, an endless carrier delivering the billets to said feeder, and a series of billet-heating furnaces grouped about the carrier, substantially as described.

5. In a wire-rod-rolling plant, the combination, with a train of reducing-rolls, of a train of horizontal carrying feed-rolls in advance of and in the feed-line of and adapted to feed the billets into said train of rolls, and an endless carrier placed laterally to said train of carrying feed-rolls, and in the relation to the heating-furnace for receiving the billets therefrom and delivering the billets or bars sidewise to said carrying feed-rolls, said rolls placed in close proximity and adapted to feed the short billets as they come from the furnace, substantially as described.

6. In a wire-rod-rolling plant, the combination of a train of roughing-rolls, a receiver whereon the bars are delivered from said roughing-rolls, a train of finishing-rolls in line with the roughing-rolls and at the extremity of the receiver, a feeder for advancing the bars from said receiver into said finishing-rolls, one or more finishing-trains placed laterally to said roughing and finishing trains, and transfer mechanism, whereby said bars may be distributed to the finishing-trains, substantially as described.

7. In a wire-rod-rolling plant, the combination of a train of roughing-rolls, a train of carrying feed-rolls in the feed-line of said rolls, an endless carrier placed laterally to the feed-rolls and delivering the billets sidewise thereto, a receiver whereon the bars are delivered from said roughing-rolls, a train of finishing-rolls in line with the roughing-rolls and at the extremity of the receiver, a feeder for advancing the bars from said receiver into said finishing-rolls, one or more finishing-trains placed laterally to said roughing and finishing train, and transfer mechanism whereby said bars may be distributed to the finishing-trains at the will of the attendant, substantially as described.

8. The combination of the roughing-train of rolls, the finishing-train in line therewith, the receiver of the bars from the roughing-train, and the lever for feeding the bars along said receiver into said finishing-train, said lever having the jointed finger, permitting the bars to pass under it onto said receiver, substantially as described.

9. The combination of the roughing-train of rolls, the finishing-train in line therewith, the receiver of the bars from the roughing-train, and the gate limiting the thrust of the bars along the receiver from the roughing-rolls, said gate connected with a lever for opening it to admit the bars to the intermediate finishing-train, substantially as described.

10. The combination, with the roughing-train, receiver on which the bars are delivered from said rolls, and the lateral transfer-chains for the bars, of the tumbling-arms adapted for transferring said bars laterally from said receiver to said transfer-chains, and lever and ratchet mechanism for shifting said tumbling-arms, substantially as described.

11. The combination of the roughing-train, receiver on which the bars are delivered from said rolls, lateral transfer-chains on each side of said receiver, a set of tumbling-arms to each side, and lever mechanism to each set of tumbling-arms adapted to tumble the bars in either direction at the will of the attendant, substantially as described.

12. The combination, with the roughing-rolls, of the receiver on which the bars are delivered therefrom, consisting of a line of carrying-rolls and the tumbling-arms, substantially as described.

13. The combination, with the roughing-rolls and the receiver on which the bars are delivered therefrom, of a series of tumbling-arms placed at intervals along a shaft arranged parallel with the receiver and having lever mechanism for shifting it, substantially as described.

14. The combination, with the roughing-rolls and the receiver on which the bars are delivered therefrom, of two series of tumbling-arms placed at intervals along a shaft arranged each side of said receiver, respectively, said shafts each having lever mechanism for shifting them, substantially as described.

15. The combination, with the tumbling-shaft, ratchet-lever, and pawl for shifting the same, of the locking-pawl for limiting the movements of the shaft, and the tappet on the pawl-lever for disengaging said locking-pawl, said ratchet having notches for said locking-pawl, substantially as described.

16. The combination, with the tumbling-shafts and arms, of the slideway-bars having the descending inclines receiving the bars from said arms, and the endless chains having the pushing-arms, substantially as described.

17. In a wire-rod-rolling plant, the train of roughing-rolls, receiver on which the bars are delivered from said rolls, the tumbling-arms for transferring the bars laterally from said receiver, slideway-bars, endless chains, and pushing-arms, the carrying feed-rolls receiving the bars laterally from said slideways, and the finishing-train of rolls receiving the bars from said carrying feed-rolls, substantially as described.

18. The combination, with the carrying feed-rolls, of the gripping-roll located over the feedway of the carrying-rolls, said gripping-roll being automatically adjustable to the bars of different sizes and having the pressure-regulating lever and weight, substantially as described.

19. The combination, with the carrying feed-rolls, of the gripping-roll located over the feedway of the carrying-rolls, said gripping-roll being automatically adjustable to the bars of different sizes and having the pressure-regulating lever and weight, and also having stops limiting its fall when the bars have passed through to admit the successive bars, substantially as described.

20. The combination, with the carrying feed-rolls, of the gripping-roll located over the feedway of the carrying-rolls, said gripping-roll being automatically adjustable to the bars of different sizes and having the pressure-regulating lever and weight, and said roll or the carrying-roll below being grooved and the other having a plain face, substantially as described.

21. In a train of carrying feed rolls, said rolls geared successively by the intermediate wheels with a roll of the train, and said roll geared with the driving-power and also geared with an upper gripping-roll, substantially as described.

22. In a train of carrying-rolls, said rolls flanged on one side only and arranged with the flange of one roll overlapping the unflanged side of the next roll successively, substantially as described.

23. The combination, with the pushing-chains and pushing-arms, of the hood located over the field of the outer reversing course of the arms, the water-receptacle below said hood, and the circulating-pipes connected with the hood and receptacle, respectively, substantially as described.

24. The combination, in the endless billet-carrier, of the endless chains, the plates jointed to the endless chains, billet-saddles on the plates, the overlapping carrying-rolls supporting the plates between the chain-wheels, and said chain-wheels, substantially as described.

25. The combination, in the endless billet-carrier, of the endless chains, the plates jointed to the endless chains, the rollers supporting the plates between the chain-wheels, said chain-wheels, and the water-troughs, said troughs partly inclosing the rollers, substantially as described.

26. In a wire-rod-rolling plant, an automatic front-end cropper, combined with and located in a train of rolls in the described arrangement for trimming off the ends of the advancing rods, and setting and tripping devices controlled for the release of the cutter by the ends of the advancing rods to be trimmed, substantially as herein set forth.

27. The combination, with a reducing-train of rolls, of a trimming-cutter for the front ends of the rods, located in said train and having a passage-way permitting the unobstructed passage of the trimmed rods, substantially as described.

28. The combination, with a reducing-train of rolls, of a trimming-cutter for the front ends of the rods, located in said train and having a passage-way permitting the unobstructed passage of the trimmed rods and a guard to exclude the ends cut off from the guideway, substantially as described.

29. The combination, with a reducing-train of rolls, of a trimming-cutter for trimming the front ends of the rods, located in said train and having a passage-way permitting the unobstructed passage of the trimmed rods, and a guard to exclude the ends cut off from the guideway, said guard consisting of the downwardly-inclined plate projecting from the back of the cutter-stock between the edge of the cutter and said guideway, substantially as described.

30. The combination, with a reducing-train of rolls, of the drop-cutter for trimming the front ends of the rods, located in said train, the lever and lever-catch for setting said drop-cutter, and the tripping-lever for releasing said cutter, said tripping-lever having one end in the guideway of the rod to be actuated by said rod, substantially as described.

31. The combination, with the reducing-train of rolls, of the drop-cutter for trimming the front end of the rods, located in said train, the lever and lever-catch for setting said drop-cutter, the tripping-lever for releasing said cutter, having one end in the guideway of the rod to be actuated by said rod, and the yielding side plate of the guideway in advance of the tripping-lever, substantially as described.

32. The combination, with the cutter-stock having the stud-pins for setting it, of the forked setting-lever having the setting-notches in the ends of the forks adapted for shifting said lever by the pins and engaging the pins by the rising of the cutter-stock, the spring-actuated catch-lever, and the tripping-lever, substantially as described.

33. The combination, with the cutter-stock having the lifting-stud, of the lifting-hook, lifting-hook-carrying sleeve on the stem of the cutter-stock, lifting-rope, the buffer-stud on the hook-carrying slide for engaging said hook with the lifting-stud of the cutter-stock, and the stud for disconnecting said lifting-hook from the lifting-stud of the cutter-stock, substantially as described.

34. In a wire-rod-rolling plant, an automatic fish-tail-rod trimmer, combined with and located in a train of rolls in the described arrangement for trimming off the tail ends of the advancing rods, and devices controlled by the fish-tail ends for actuating the cutter, substantially as described.

35. In a wire-rod-rolling plant, an automatic fish-tail-rod trimmer, combined with and located in a train of rolls and consisting of the forked lever arranged in the guideway of the rods to be shifted by the fish-tail ends, and the cutter connected with and adapted to be thrust against the rods in advance of said fork, substantially as described.

36. In a wire rod-rolling plant, an automatic fish-tail-rod trimmer, combined with and located in a train of rolls and consisting of the forked lever arranged in the guideway of the rods to be shifted by the fish-tail ends, and the cutter connected with and adapted to be thrust against the rods in advance of said fork, said forked lever having a weighted arm for restoring the fork and the cutter to the normal positions, substantially as described.

37. In a wire-rod-rolling plant, an automatic fish-tail-rod trimmer, combined with and located in a train of rolls and consisting of the forked lever arranged in the guideway of the rods to be shifted by the fish-tail ends, and the cutter connected with and adapted to be thrust against the rods in advance of the fork, said fork having a yielding relief-prong, substantially as described.

38. The combination of the discharging-rod, its operating-lever, and the fixed stud for operating the said lever with the forked lever, said discharging-rod fixed in a slideway on the forked lever, and its operating-lever pivoted on said forked lever, and the fixed stop supported on the housing-frame, all substantially as described.

39. In a wire-rod-rolling plant, an automatic fish-tail trimmer, combined with and located in a train of rolls and consisting of the forked lever arranged in the guideway of the rods to be shifted by the fish-tail ends, and the cutter connected with and adapted to be thrust against the rods in advance of said fork, said guideway having the openings in the upper and lower sides for the fish-tail engaging fork and the cutter, and also having the plate of the upper side opposing the thrust of the cutter on the rods, substantially as described.

40. In a wire-rod-rolling plant, an automatic fish-tail-rod trimmer, combined with and located in a train of rolls and consisting of the forked lever arranged in the guideway of the rods to be shifted by the fish-tail ends, and the cutter connected with and adapted to be thrust against the rods in advance of the forked lever, the forked lever being pivoted at one side of the guideway, and the cutter pivoted at the opposite side, said guideway having the openings for said fork and cutter, and the plate of the upper side opposing the thrusts of the cutter, substantially as described.

In testimony that I claim the foregoing as my invention I have signed my name, in presence of two witnesses, this 14th day of November, 1890.

THOMAS V. ALLIS.

Witnesses:
ANSON P. THAYER,
W. J. MORGAN.